United States Patent
Kress et al.

(10) Patent No.: US 7,534,075 B2
(45) Date of Patent: May 19, 2009

(54) KNIFE PLATE AND TOOL FOR MACHINING BORE SURFACES

(75) Inventors: Dieter Kress, Aalen (DE); Friedrich Häberle, Lauchheim (DE)

(73) Assignee: Mapal Fabrik für Präzisionswerkzeuge Dr. Kress KG (DE)

( * ) Notice: Subject to any disclaimer, the term of this patent is extended or adjusted under 35 U.S.C. 154(b) by 190 days.

(21) Appl. No.: 10/599,709

(22) PCT Filed: Apr. 20, 2005

(86) PCT No.: PCT/EP2005/004192

§ 371 (c)(1),
(2), (4) Date: Oct. 19, 2006

(87) PCT Pub. No.: WO2005/102574

PCT Pub. Date: Nov. 3, 2005

(65) Prior Publication Data

US 2007/0217876 A1    Sep. 20, 2007

(30) Foreign Application Priority Data

Apr. 22, 2004   (DE) .................. 10 2004 019 535

(51) Int. Cl.
  *B23B 1/00* (2006.01)
  *B23B 3/00* (2006.01)
(52) U.S. Cl. .................. 407/66; 407/67; 407/113
(58) Field of Classification Search ......... 407/113–116, 407/30, 33, 66, 67, 103, 107
See application file for complete search history.

(56) References Cited

U.S. PATENT DOCUMENTS

| 3,434,190 | A | * | 3/1969 | Kaiser | 407/113 |
| 4,990,036 | A | * | 2/1991 | Eklund et al. | 407/113 |
| 5,947,649 | A | * | 9/1999 | Arai et al. | 407/34 |
| 6,079,912 | A | | 6/2000 | Rothballer | 407/114 |
| 6,213,691 | B1 | | 4/2001 | Leeb | |

FOREIGN PATENT DOCUMENTS

| DE | 2 163 842 | 6/1973 |
| DE | 197 09 436 | 9/1998 |
| EP | 0 313 534 A | 4/1989 |

OTHER PUBLICATIONS

International Preliminary Report on Patentability dated Feb. 8, 2007.
International Search Report PCT/EP2005/004192 dated Aug. 24, 2005.

* cited by examiner

*Primary Examiner*—Willmon Fridie
(74) *Attorney, Agent, or Firm*—Ostrolenk, Faber, Gerb & Soffen, LLP

(57) ABSTRACT

A tool is proposed for metal-cutting machining of bore surfaces with at least one cutter insert (1*s*, 1'*s*; 1*u*, 1'*u*, 1"*u*) which is let into the end face (41) of the tool (10) and at least one cutter insert (1*s*, 1'*s*; 1*u*, 1'*u*, 1"*u*) which is let into the circumferential face (43) of the tool (10), said cutter inserts (1*s*, 1'*s*; 1*u*, 1'*u*, 1"*u*) having at least two geometrically defined cutting edges. Said tool is characterized by the fact that one of the cutting edges of the cutter inserts is embodied as a roughing cutting edge (17, 17') and the other cutting edge of the cutter inserts is embodied as a finishing cutting edge (19, 19'), and in that the cutting edges are arranged on the two ends of a side edge (15, 15') of the cutter inserts.

17 Claims, 2 Drawing Sheets

US 7,534,075 B2

KNIFE PLATE AND TOOL FOR MACHINING BORE SURFACES

CROSS REFERENCE TO RELATED APPLICATION

The present application is a 35 U.S.C. §§ 371 national phase conversion of PCT/EP2005/004192, filed 20 Apr. 2005, which claims priority of German Application No. 10 2004 019 535.8, filed 22 Apr. 2004. The PCT International Application was published in the German language.

BACKGROUND OF THE INVENTION

The invention relates to a cutter insert and to a tool for the metal-cutting machining of bore surfaces.

Cutter inserts and tools of the type mentioned here are known. The cutter inserts are provided with a front side and upper side. During the metal-cutting machining of a bore surface, the front side faces in the direction of rotation of a tool, into which bore surface the cutter insert is inserted. In the mounted state, the upper side points away from the base body of the tool. The intersection line between the front side and upper side forms at least two geometrically defined cutting edges which lie at the ends of a side edge formed by the intersection line.

Tools of the type mentioned above have at least two cutter inserts, one of which is let into the end face and another of which is let into the circumferential face of the tool. The cutter inserts have at least two geometrically defined cutting edges.

A disadvantage of the known cutter inserts and tools is that they can be used only for one specific machining operation, the roughing machining or the finish machining of a bore surface. It is therefore necessary to provide different cutter inserts or tools for different machining operations. When such cutter inserts and tools are used, it is easily possible for confusions to occur because on first sight roughing cutting edges and finishing cutting edges cannot be readily differentiated, in particular on relatively small cutter inserts. Such confusion can lead to damage to the machined workpiece or else to the tool.

SUMMARY OF THE INVENTION

The object of the invention is to provide a cutter insert and a tool which do not have these disadvantages.

In order to achieve this object, a cutter insert is proposed which has the features herein. It is distinguished by the fact that it has a side edge formed by an intersection line of the front side and upper side and at whose ends respectively geometrically defined cutting edges are provided. These are embodied in different ways so that one of the cutting edges can be used as a roughing cutting edge and the other as a finishing cutting edge.

In order to achieve this object, a tool is proposed which serves for metal-cutting machining of bore surfaces and comprises at least one first cutter insert which is inserted into the end face of the tool and at least one second cutter insert which is inserted into the circumferential face, said cutter inserts each having at least two geometrically defined cutting edges. The tool is distinguished by the fact that one of the cutting edges of the cutter inserts is embodied as a roughing cutting edge and the other is embodied as a finishing cutting edge, and in that the cutting edges are arranged at the two ends of a side edge of the cutter insert. This arrangement of the two types of cutting edge on the cutter insert ensures, for example, that when a cutter insert is attached to the circumferential face of the tool, its roughing cutting edge engages with the bore surface to be machined, and that, correspondingly, when the cutter insert is installed in the end face of the tool, its finishing cutting edge acts on the bore surface to be machined. Depending on the orientation of the cutter insert on the base body of the tool, the various types of cutting edge therefore engage with the workpiece. On the one hand it is therefore possible to use identical cutter inserts, which reduces the costs of stock holding. On the other hand, it is ensured that in each case the desired cutting edge engages with the tool after it has been mounted on the tool.

BRIEF DESCRIPTION OF THE DRAWINGS

The invention will be explained in more detail below with reference to the drawings, in which.

DESCRIPTION OF A PREFERRED EMBODIMENT

Figure 1:
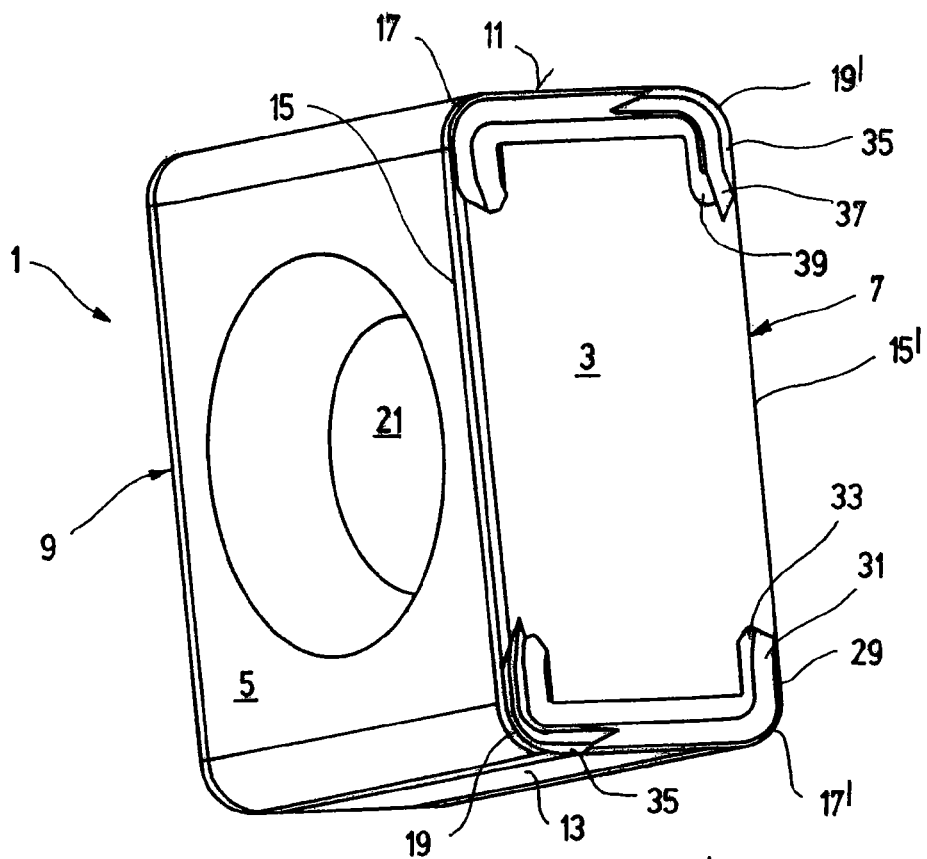
FIG. 1 shows a perspective view of a cutter insert, with the front and upper sides being visible.

The cutter insert 1 illustrated in FIG. 1 has a front side 3 which faces the viewer and, when the cutter insert 1 is in use, points in the direction of rotation of the tool which serves for the metal-cutting machining of a bore using the cutter insert 1. The cutter insert 1 also has an upper side 5 which, when the cutter insert is installed in a tool, faces away from the base body of said tool. Lying opposite the upper side 5, an under side 7 which is arranged parallel thereto is provided, and correspondingly a rear side 9 is provided lying opposite the front side 3, said rear side 9 extending parallel to the front side 3. The front side 3 and the rear side 9 are continuous with side faces 11 and 13 of the cutter insert 1 via regions which are preferably bent in the shape of a circular arc, said side faces 11 and 13 being narrower than the front and rear sides of the cutter insert 1. Therefore, the latter is embodied here in the shape of a rectangle viewed from the front side 3. However, it is also conceivable to embody the cutter insert 1 in such a way that the front side 3 is square.

The intersection line of the front side 3 with the upper side 5 forms a side edge 15, and correspondingly the intersection line of the front side 3 with the lower side 7 forms a side edge 15'.

Geometrically defined cutting edges are provided at the ends of the side edge 15, and here the upper cutting edge near to the upper side face 11 is configured as a roughing cutting edge 17, while the cutting edge which is provided at the lower end of the side edge 15 is embodied as a finishing cutting edge 19. There are therefore different cutting edges on the ends of the side edge 15 which lie opposite one another.

The cutter insert 1 can also be arranged in an inverted fashion on a tool so that its upper side 5 is directed towards the base body of the tool and the lower side 7 faces the viewer. It is therefore possible to embody the cutter insert 1 as a disposable cutting tool tip and to rotate it about a virtual axis which extends perpendicularly from the center point of the front side 3.

The side edge 15' is embodied with point symmetry with respect to the side edge 15: a finishing cutting edge 19' is provided at the top and a roughing cutting edge 17' at the bottom. The cutting edges are therefore the same in pairs diagonally opposite one another and are respectively configured alternately as a finishing cutting edge and a roughing cutting edge along the side edges of the front side 3.

There is preferably provision for the rear side 9 to be embodied in an identical way to the front side. It is therefore possible to rotate the cutter insert 1 through 180° about a virtual axis which extends perpendicularly from the center point of the upper or lower side face 11, 13 or the upper side 5 or the lower side 7. If the cutter insert 1 were to be rotated about this axis, the rear side 9 would therefore appear identical to the front side 3 illustrated here, and would also be provided with finishing and roughing cutting edges.

Finally, FIG. 1 also shows that the cutter insert 1 has a bore 21 which perpendicularly penetrates the upper side 5 and the rear side 9. The bore for receiving a clamping screw 23 (not illustrated here) with which the cutter insert 1 can be attached to the base body of a tool.

The cutter insert 1 is attached to the base body of a tool, essentially tangentially to the end face and/or to the circumferential face of said tool. The forces which are applied to the cutter insert via the roughing cutting edges 17, 17' or finishing cutting edges 19, 19' extend essentially perpendicularly to the center axis of the clamping screw 23 in the bore 21. Such a cutter insert is referred to as a tangential insert.

Figure 2:
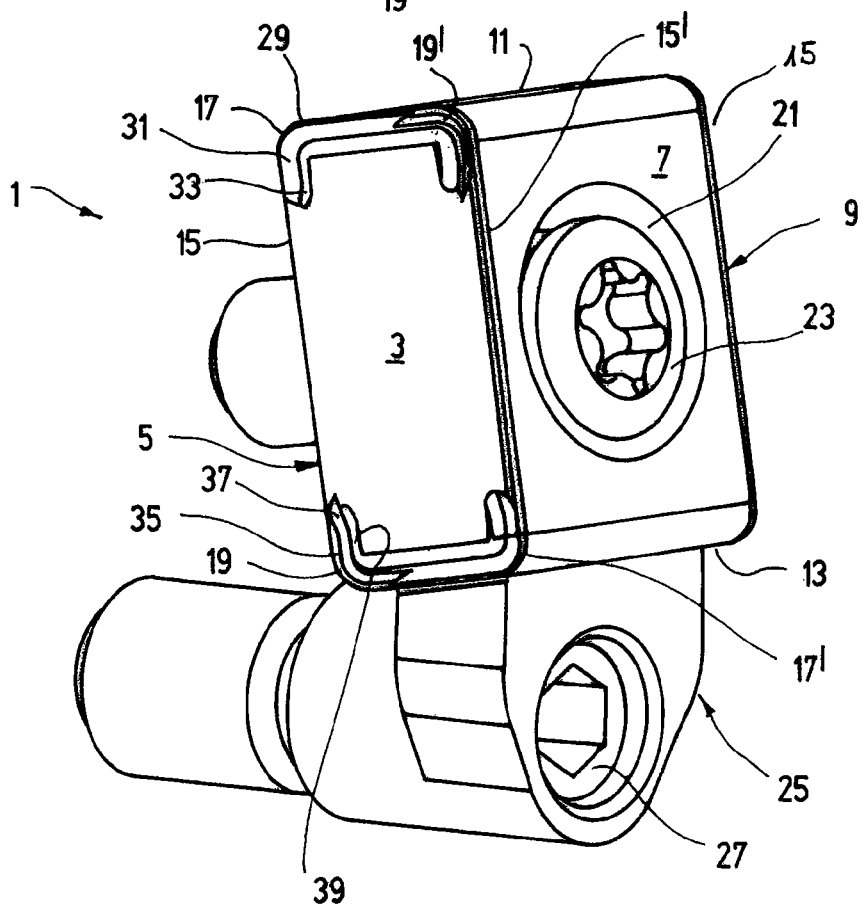
FIG. 2 shows a further perspective view of a cutter insert together with a clamping screw and a positioning wedge.

FIG. 2 shows the cutter insert 1 according to FIG. 1 in a perspective view after rotation through 90° about a virtual axis which extends perpendicularly from the side faces 11 and 13. Identical parts are provided with identical reference symbols so that in this respect reference is made to the description relating to FIG. 1 in order to avoid repetitions.

In the illustration according to FIG. 2, the clamping screw 23 which is provided with an external thread can be seen, said clamping screw 23 penetrating the cutter insert 1 and engaging in the base body (not illustrated) of a tool.

A positioning wedge 25 which is attached to the base body of the tool by means of a positioning screw 27 and preferably has two threaded regions which are embodied in opposite directions bears against the lower side face 13. A first threaded region interacts with the positioning wedge 25, and a second interacts with the base body of the tool.

A positioning wedge 25 of the type mentioned here is basically known. It serves here to change the position of the cutter insert 1 perpendicularly with respect to the center axis of the clamping screw 23 in order, for example, to set the amount by which a cutter insert 1 which is inserted into the end face of a tool protrudes radially by virtue of the fact that it can be moved in the direction of its center axis using the positioning screw 27.

From the illustration according to FIG. 2 it is apparent that the finishing cutting edge 17 has a protective chamfer 29 which runs round the outside and has a rake of 0°, that is to say the protective chamfer encloses an angle of 90° with the upper side 5. A main rake face 31 which is continuous with a chip-breaking edge 33 follows the protective chamfer. Chips which have been removed by the roughing cutting edge 17 therefore run off from the protective chamfer 29 via the main rake face 31 to the chip breaking edge 33 where they are broken.

The finishing cutting edge 19 has two rake faces, a first rake face 35 dropping away from the finishing cutting edge 19 at a steeper angle than a second rake face 37 which adjoins it. The two rake faces are continuous with a chip breaking edge 39 at which chips which have been removed by the finishing cutting edge 19 and which run off via the two rake faces 35 and 37 are broken.

The refinements of the roughing cutting edge 17 and the finishing cutting edge 19 which are explained with reference to FIG. 2 are also shown in FIG. 1 where the reference symbols mentioned here have also been used.

In FIG. 1 it also becomes clear that in particular the protective chamfer 29 is made very narrow, which is indicated by two lines extending at a short distance from one another.

To summarize, with respect to the explanations relating to FIGS. 1 and 2 it is noted that the cutter insert 1 preferably has identical boundary faces, specifically identical front and rear sides 3, 9, identical upper and lower sides 5 and 7 and identical side faces 11 and 13. The roughing and finishing cutting edges 17, 17' and 19, 19' which are provided on the front and rear sides 3 and 9 are arranged lying opposite one another in pairs on the side edges 15 and 15' of the front side 3 and rear side 9. As a result, the cutter insert 1 can be used as an interchangeable insert. It can be rotated through 180° about a perpendicularly on the center point of the upper side 5 or lower side 7 or about an axis, the axis which extends perpendicularly from the center point of the front side 3 or rear side 9, or about an axis which extends perpendicularly from the center point of the side faces 11 or 13.

Figure 3:
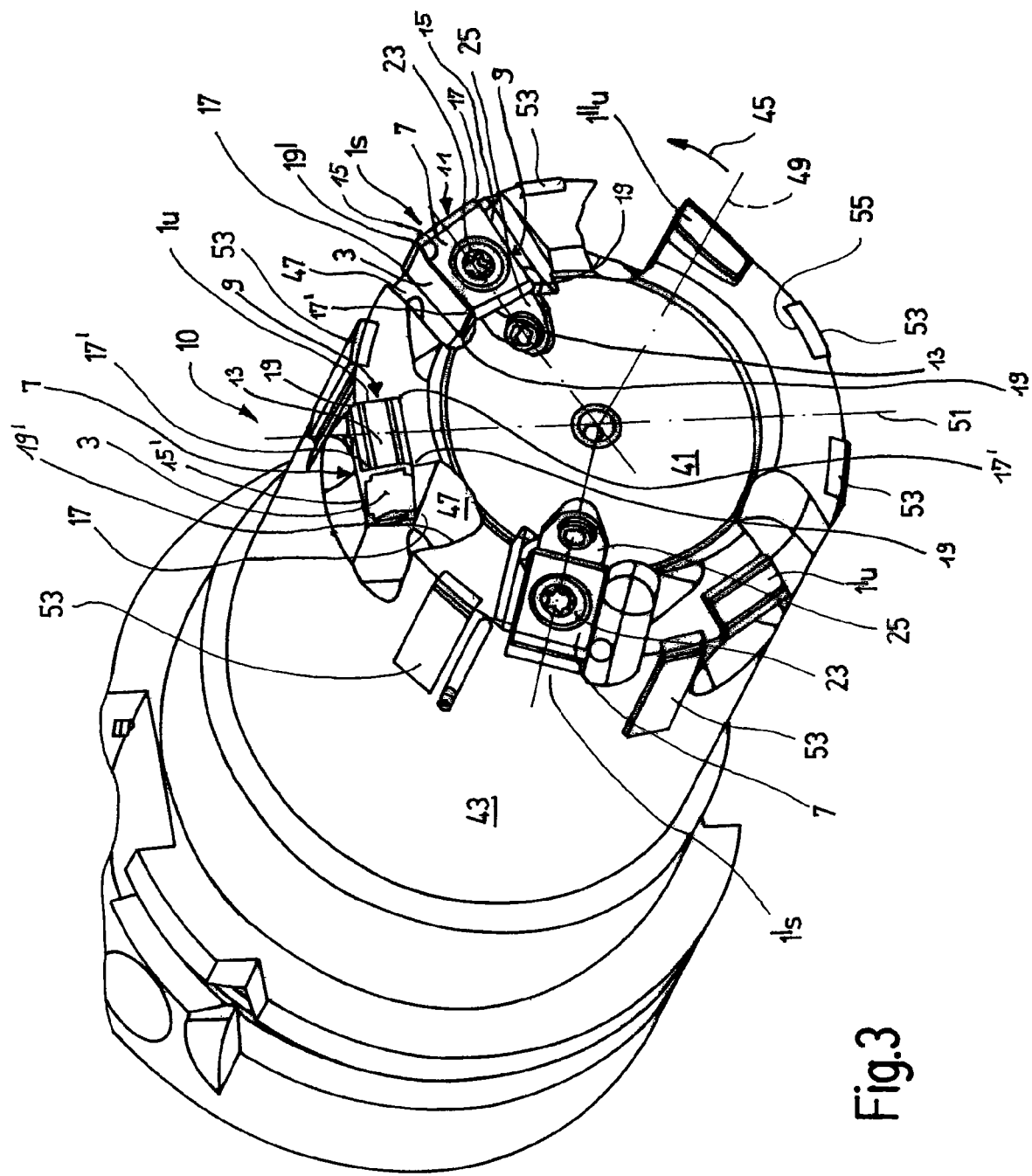
FIG. 3 shows a perspective front view of a tool with cutter inserts which are inserted into the side face and circumferential face.

FIG. 3 shows a tool 10 in a perspective view obliquely from the front. FIG. 3 therefore shows the end face 41 and the circumferential face 43 of the tool 10 into each of which at least one cutter insert 1 according to FIGS. 1 and 2 is inserted essentially tangentially. The tool 10 is broken off in the left-hand region. It can be connected directly or via an adapter to a machine tool or else to other tools on which further details are not given here.

In the exemplary embodiment illustrated here, two cutter inserts 1s and 1's are inserted into the end face 41. These cutter inserts are of identical design to those described above. Identical parts are provided with identical reference symbols. In this respect, reference is made to the description relating to FIGS. 1 and 2.

The cutter inserts 1s and 1's are as it were inserted tangentially into the end face 41 so that their faces which are turned towards the viewer extend essentially parallel to the end face 41. Positioning wedges 25 with which the amount by which the cutter inserts 1s, 1's protrude beyond the circumferential face 43 can be adjusted are provided here.

In the illustration according to FIG. 3, the cutter inserts 1 are installed in the position in the end face which is shown in FIG. 2. The lower sides 7 are therefore turned to the viewer in FIG. 3.

On the cutter insert is it is possible to see the front side 3 with the external finishing cutting edge 19' which engages with the surface of the bore to be machined when the tool 10 is introduced into said bore.

In the direction of rotation of the tool 10 which is indicated by an arrow 45, a rake groove 47 is provided in front of the front side 3 and chips which are removed from the cutter insert is can run off via said rake groove 47. A corresponding rake groove is also provided in the cutter insert 1's.

The cutter insert 1s has, as explained with reference to FIG. 2, a rear side 9 which is concealed here. The side edge 15 with the finishing cutting edge 17 and the roughing cutting edge 19 can be seen. It is clear that the finishing cutting edge 19' of the front side is arranged together with the roughing cutting edge 17' on the side edge 15.

The center axis 49 of the tool 10 faces away from the side face 11.

The cutter insert 1s is slightly pivoted out of the precise tangential position. The external side face 11 is located somewhat higher than the side face 13 which lies opposite and bears against the positioning wedge 25. As a result, the finishing cutting edge 19' which is assigned to the front side 3 is located at a higher position than the roughing cutting edge 17' which is provided in the region of the same side edge 15. In other words, the finishing cutting edge 19' projects further beyond the end face 41 of the tool 10 than the roughing cutting edge 17'. The cutter insert 1s is thus pivoted about a perpendicular axis which extends from the center point of the front side 3.

Furthermore, the cutter insert 1s is pivoted about an axis which extends perpendicularly from the side face 13 and thus from the side face 11. In this context there is provision for the finishing cutting edge 19' of the front side 3 to be arranged somewhat higher, and thus to project somewhat further beyond the end face 41, than the roughing cutting edge 17 which is assigned to the rear side 9.

As a result of the two superimposed pivoting actions, the finishing cutting edge forms the highest point of the cutter insert 1s with respect to the end face 41. Since the front and rear sides 3, 9, the upper and lower sides 5, 7 and the side faces 11 and 13 are embodied in identical ways, the cutter insert is can be inserted in any desired fashion into the end face 41 of the tool 10. It is therefore insignificant whether, as illustrated in FIG. 3, the lower side 7 points forwards or the upper side 5, whether the side face 11 points outwards, or the side face 13. Since the cutter insert 1s is tilted about the two axes described above and the finishing cutting edge of the front side always forms the highest point, the cutter insert of the type mentioned here, which is inserted into the end side 41 of the tool 10, always serves for finish machining.

The specific positioning of the cutter insert in the end side, which differs slightly from a precisely tangential arrangement, applies to all the cutter inserts which are inserted into a tool 10, that is to say to the two cutter inserts 1s and 1's here.

It therefore becomes apparent that irrespective of the number of cutter inserts inserted into the end face 41 and irrespective of their arrangement, a finishing cutting edge for machining a tool is always made available. Therefore, even though the cutter inserts have both roughing and finishing cutting edges, the desired finishing cutting edge is always made available as an active cutting edge when a cutter insert is inserted into the end face.

FIG. 3 also shows the clamping screws 23 which penetrate the cutter inserts 1s and 1's and with which the cutter inserts are attached to the base body of the tool 10.

Virtual connecting lines between the center points of the screws 23, which hold the cutter inserts 1s and 1's, and the center axis 49 of the tool 10 enclose, for example, an angle of 120°. The cutter inserts 1s and 1's are arranged symmetrically to a diameter line 51 which extends perpendicularly to the end face 41 and intersects the center axis 49.

In the region in which the diameter line 51 intersects the circumferential face 43 of the tool 1 at the top, a cutter insert 1u is inserted. Here too, it is possible to see the front side 3 of the cutter insert which has a roughing cutting edge 17'. When inserted into the tool 10, the latter removes chips from a bore wall. In the illustration according to FIG. 3 it is assumed that the face of the cutter insert 1u designated as the rear side 7 in FIG. 2 faces away from the center axis 49 of the tool 10, that is to say points outwards. The side face 13 which is explained with reference to FIGS. 1 and 2 faces the viewer here. The rear side 9 which lies opposite the front side 3 cannot be seen here. The latter has, like the front side 3, roughing and finishing cutting edges of which the finishing cutting edge 17' and the finishing cutting edge 19 can be seen.

It is clearly apparent that even though the cutter insert 1u is inserted essentially tangentially into the circumferential face 43, it is actually inclined at an angle with respect to it, specifically in such a way that the roughing cutting edge 17' protrudes beyond the circumferential face 43, while the finishing cutting edge 19' which lies opposite and is also assigned to the side edge 15' is arranged offset with respect to the circumferential face 43 towards the inside in the direction of the center axis 49.

The cutter insert 1u is additionally arranged rotated about an axis in the circumferential face 43 which extends perpendicularly from the center point of the side face 13, specifically in such a way that the roughing cutting edge 17' of the front side 3 projects somewhat further beyond the circumferential face 43 than the finishing cutting edge 19 provided on the rear side 9.

Finally, the cutter insert 1u is thus tilted out of a precisely tangential position in two directions, specifically about an axis which extends perpendicularly from the center point of the front side, and about the axis which extends perpendicularly from the center point of the side face 13. This ensures that the active cutting edge of the cutter insert 1u, specifically the roughing cutting edge 17', protrudes furthest beyond the circumferential face 43 of the tool 1, and that both the finishing cutting edge 19' provided on the front side 3 and the finishing cutting edge 19 provided on the rear side 9 are set back with respect to this active cutting edge.

The arrangement as described here of the cutter insert 1u in the circumferential face 43 of the tool 1 is identical in all the cutter inserts which are arranged as it were tangentially in the circumferential face 43, irrespective of whether the front side or rear side faces away from the center axis 49 or whether the side face 11 or 13 faces the viewer in FIG. 3.

Viewed in the direction of rotation, a chip space 47 is in turn provided in front of the front side 3 of the cutter insert 1u.

In the exemplary embodiment illustrated in FIG. 3, a uniform distance is provided between three cutter inserts 1u, 1'u and 1"u and their orientation is identical to that which was explained for the cutter insert 1u.

Viewed in the circumferential direction, guide bars are respectively provided between the cutter insert 1"u and 1s as well as between 1s and 1u, 1u and 1's and between 1's and 1'u. Two guide bars 53 which are arranged symmetrically to the diameter line 51 are provided between the cutter inserts 1'u and 1"u.

The guide bars explained with respect to FIG. 3 make it possible to implement tools 10 with a large protruding length.

The guide bars are inserted in the usual way into grooves 55 which are introduced into the circumferential face 43 and extend, viewed in the direction of the center axis 49, over a region which is greater than the extent of the cutter inserts 1u, 1'u and 1"u measured in this direction. They serve to reliably guide the tool 10 in a machined bore.

FIG. 3 shows that the tool 10 therefore has at least one cutter insert 1s, 1u which is inserted into the end face 41 and into the circumferential face 43, said cutter inserts 1s, 1u each comprising at least two geometrically defined cutting edges. The cutting edges of each of the cutter inserts are embodied as a roughing cutting edge 17 and as a finishing cutting edge 19. Here, disposable cutting tool tips are provided which have roughing cutting edges 17, 17' and finishing cutting edges 19, 19' which lie respectively diagonally opposite one another, which has been explained in detail with reference to FIGS. 1 and 2.

The cutter inserts are embodied in such a way that when they are installed in the end face 41, their finishing cutting edges 19 engage with the bore to be machined and when they are installed in the circumferential face 43, their roughing cutting edges 19 machine the bore surface. It is completely irrelevant here whether the cutter inserts face the base body of the tool 10 with their upper side 5 or their lower side 7. It is also possible for the cutter inserts to be installed rotated through 180° about the center axis of the clamping screw 23. The desired cutting edges always engage as a function of the installation position. When the cutter insert is installed in the circumferential face 43, the roughing cutting edges 19, 19' engage, and when the cutter insert is installed in the end face 41 the finishing cutting edges 17, 17' engage. The possibility of one of the cutter inserts being incorrectly inserted into the tool 10 is thus excluded. However, a precondition—and this is self-evident to a person skilled in the art, is that in each case a front side 3 or rear side 7 points in the direction of rotation.

Since all the cutter inserts are identical, the stock holding is simplified greatly. Repair works and the initial equipping of a tool can easily be carried out because incorrect installation of cutter inserts is not possible.

The cutter inserts described here can, however, be used only with tools which are made to rotate in the direction indicated by the arrow 45 during the machining of a bore surface. If the direction of rotation is reversed, the cutter inserts have to be embodied in mirror-inverted fashion, that is to say it is necessary to provide roughing cutting edges at the corners at which finishing cutting edges are provided here, and vice versa.

The tool 10 described here is distinguished by the fact that it can easily be equipped with cutter inserts and identical cutter inserts can be used even though the tool is used for premachining and finish machining by virtue of the fact that depending on the installation position of the cutter inserts, their roughing cutting edges or finishing cutting edges engage with the bore wall to be machined. There is provision here for the roughing cutting edges to move in advance of the finishing cutting edges when viewed in the axial direction, that is to say in the direction of the center axis 49. In contrast, the finishing cutting edges protrude further beyond the circumferential face 43 than the roughing cutting edges when viewed in the radial direction.

The number of finishing cutting edges and roughing cutting edges can be adapted to various conditions. It is possible, for example, to provide two cutter inserts which lie opposite one another in pairs, with two cutter inserts which lie opposite one another being located in the end face 41 and two cutter inserts being arranged offset by 90° thereto in the circumferential face 43. However, it is also conceivable to install three cutter inserts in the end face 41 and just two cutter inserts in the circumferential face 43. Conversely, three cutter inserts can be provided in the circumferential face and two in the end face. For example it is also possible to insert four cutter inserts into the circumferential face 43 for premachining and only one cutter insert into the end face 41 for finish machining. However, this only permits a lower advancing speed to be implemented.

From the explanations it also becomes clear that the cutter inserts can be embodied as rectangles or squares viewed from above or below, that is to say in the direction of the center axis of the bore 21. Finally, it is, however, also possible to implement cutter inserts with three or more than four corners. The distribution of the roughing cutting edges and finishing cutting edges which is provided here is decisive in order to ensure that when the cutter insert is installed virtually tangentially into the end face 41, the finishing cutting edges are active, while when the cutter insert is installed tangentially into the circumferential face 43, the roughing cutting edges engage with the tool to be machined. In this context it is possible, as is explained with reference to FIG. 3, to provide for the cutter inserts which are inserted into the circumferential face 43 to be inclined in order to permit a gentler first cut with a chip which becomes thicker.

From the explanations it becomes clear that in a tool 10 of the type described here it is also possible to install in its end face 41 cutter inserts whose roughing cutting edges are active, while cutter inserts whose finishing cutting edges engage with the tool to be machined are inserted into the circumferential face 43. It is therefore basically possible to retain the design of the tool 10 explained with the reference to FIG. 3 but, through corresponding configuration of the cutter inserts, to allow finishing cutting edges in the end side 41 and roughing cutting edges in the circumferential face 43 to become active. In this amended embodiment it would preferably also be possible to adjust the cutter inserts by means of an adjustment device whose finishing cutting edges engage with the tool to be machined. Apart from the configuration of the cutter inserts, the decisive factor then is the arrangement of the cutting edges: the finishing cutting edges lag behind the roughing cutting edges viewed in the axial direction and move in advance of them viewed in the radial direction. Correspondingly, the roughing cutting edges move in advance of the finishing cutting edges viewed in the axial direction and lag behind them viewed in the radial direction.

Finally, it is also still possible not only to make different selections for the contour of the finishing cutting edges and roughing cutting edges, as has been described above. It is also possible to use different materials in the region of the roughing cutting edges and finishing cutting edges. For example, hard metal can be provided in the region of the roughing cutting edge, while, for example, a PKD coating or else a cutting insert can be provided in the region of the finishing cutting edge.

The essential basic idea is that it is possible to use identical cutter inserts for a tool 10 even though the tool is used both for premachining and for finish-machining. Depending on the installation position of the cutter inserts and their configuration, only their roughing cutting edges or their finishing cutting edges engage at any time with the bore wall to be machined.

The invention claimed is:

1. A tool for metal-cutting machining of a bore surface, the tool having a rotation axis, an end face leading the tool and a circumferential face at and around the end face, the tool comprising;
    a first cutter insert positioned at the end face of the tool and a second cutter insert positioned at the circumferential face of the tool, each of the first cutter insert and the second cutter insert having a side edge which extends between a first side end and a second side end of the side edge,
    each of the cutter inserts has at least a first geometrically defined cutting edge and a second geometrically defined cutting edge, the first cutting edge of each cutter insert comprising a roughing cutting edge and the second cutting edge of each cutter insert comprising a finishing cutting edge, the first cutting edge and the second cutting edge being arranged respectively at the first and second side ends of the side edge;
    the first cutter insert is oriented tangentially to the end face so as to serve either only for finish machining or only for roughing machining, and the second cutter insert is oriented tangentially to the circumferential face so as to serve only for the other of either roughing machining or finish machining.

2. The tool as claimed in claim 1, wherein the first cutter insert has a front side when in a mounted state on the tool and during the metal-cutting machining of a workpiece, the front side of the first cutter insert is oriented to point in a direction of rotation of the tool around the rotation axis, and the first cutter insert has an upper side which in the mounted state of the first cutter insert on the tool faces away from the tool, and the respective first and second cutting edges which are active in the mounted state of the first cutter insert are arranged on the side edge which forms an intersection line of the front side and the upper side of the first cutter insert.

3. The tool as claimed in claim 2, wherein the first cutter insert comprises a plurality of side edges,
   a disposable cutting tool tip having two cutting edges which lie diagonally opposite one another on the front side and are identical in structure, and the first and second cutting edges alternate along a sequence of adjacent ones of the side edges.

4. The tool as claimed in claim 2, wherein at least the first cutter insert has a rear side which lies opposite the front side of the first cutter insert, extends parallel to the front side of the first cutter, and is identical to the front side of the first cutter.

5. The tool as claimed in claim 2, wherein the second cutter insert is identical with the first cutter insert.

6. The tool as claimed in claim 1, further comprising a setting device configured to interact with the at least one of the cutting edges at the end face of the tool.

7. The tool as claimed in claim 1, wherein the first cutter insert operable for roughing machining moves in advance of the second cutter insert operable for finish machining, as viewed in an axial direction and in an advancing direction of the tool.

8. The tool as claimed in claim 2, wherein the second cutter insert at the circumferential face of the tool is inclined as viewed in an axial direction of the tool with the first cutting edge, which is a roughing cutting edge operable for roughing machining and projecting beyond the circumferential face of the tool, and with the second cutting edge, which is a finishing cutting edge, being provided on the same side edge of the second cutter insert and being operable for finish machining and being set back with respect to the circumferential face of the tool.

9. The tool as claimed in claim 2, wherein the second cutter insert at the circumferential face of the tool is inclined as viewed transversely with respect to an axial direction of the tool with the first cutting edge, which is a roughing cutting edge operable for roughing machining, of the front side of the second cutter insert and projecting further beyond the circumferential face of the tool than the second cutting edge of the rear side of the second cutter insert, which is a finishing cutting edge and lags behind the roughing cutting edge and serves for finish machining, the finishing cutting edge being arranged, like the roughing cutting edge, in a region of a lateral face of the cutter insert.

10. The tool as claimed in claim 1, further comprising a third cutter insert arranged as a pair of the first cutter insert positioned circumferentially opposite the first cutter insert on the tool and having a structure and function identical with the first cutter insert and a fourth cutter insert arranged as a pair of the second cutter insert positioned circumferentially opposite the second cutter insert on the tool and having a structure and function identical with the second cutter insert.

11. The tool as claimed in claim 1, comprising a third cutter insert and a fourth cutter insert positioned along with the second cutter insert at equal distances from one another around the circumferential face of the tool, and viewed from the rotation axis of the tool, positioned between every two of the cutter inserts around the circumferential face is another of the cutter inserts at the end face.

12. The tool as claimed in claim 1, further comprising three of the cutter inserts positioned at the end face of the tool and two of the cutter inserts positioned at the circumferential face of the tool.

13. The tool as claimed in claim 1, further comprising one of the cutter inserts positioned at the end face of the tool and four of the cutter inserts positioned at the circumferential face of the tool.

14. The tool as claimed in claim 2, wherein the first cutter insert at the end face of the tool is tilted about an axis at a center point of a side face of the first cutter insert or is tilted about an axis perpendicular to a line drawn between center points of the front side and the rear side of the first cutter insert.

15. The tool as claimed in claim 2, further comprising at least one tool rotation guide bar at the circumferential face of the tool.

16. The tool as claimed in claim 15, wherein the at least one guide bar is provided between the first cutter insert and a third cutter insert identical in structure with the first cutter insert positioned at the end face of the tool.

17. The tool as claimed in claim 15, wherein the at least one guide bar is provided between the second cutter insert and a fourth cutter insert identical in structure with the second cutter insert positioned at the circumferential face of the tool.

* * * * *